US005650927A

United States Patent [19]

Guckenheimer

[11] Patent Number: 5,650,927

[45] Date of Patent: Jul. 22, 1997

[54] CONTROL METHOD FOR PHYSICAL SYSTEMS AND DEVICES

[75] Inventor: John Guckenheimer, Ithaca, N.Y.

[73] Assignee: Cornell Research Foundation, Inc., Ithaca, N.Y.

[21] Appl. No.: 494,210

[22] Filed: Jun. 23, 1995

[51] Int. Cl.$^6$ .......... G05B 13/02

[52] U.S. Cl. .......... 364/176; 364/152

[58] Field of Search .......... 364/176, 148, 364/152, 155; 318/611

[56] References Cited

U.S. PATENT DOCUMENTS 4,257,093 3/1981 Peirson et al. .......... 364/155
4,545,008 10/1985 Sominin et al. .......... 364/155 X
5,179,513 1/1993 Breckner .......... 364/148 X

*Primary Examiner*—Joseph Ruggiero
*Attorney, Agent, or Firm*—Salzman & Levy

[57] ABSTRACT

A control method for stabilizing systems or devices that are outside the control domain of a linear controller is provided. When applied to nonlinear systems, the effectiveness of this method depends upon the size of the domain of stability that is produced for the stabilized equilibrium. If this domain is small compared to the accuracy of measurements or the size of disturbances within the system, then the linear controller is likely to fail within a short period. Failure of the system or device can be catastrophic: the system or device can wander far from the desired equilibrium. The method of the invention presents a general procedure to recapture the stability of a linear controller, when the trajectory of a system or device leaves its region of stability. By using a hybrid strategy based upon discrete switching events within the state space of the system or device, the system or device will return from a much larger domain to the region of stability utilized by the linear controller. The control procedure is robust and remains effective under large classes of perturbations of a given underlying system or device.

12 Claims, 5 Drawing Sheets

CONTROL METHOD FOR PHYSICAL SYSTEMS AND DEVICES

The present invention was developed under U.S. Army contract no. DAAA21-92-C-0013; NSF Grant No. DMS-9002577; AFOSR Contract No. 91-0329; and DOE Contract No. DEFG02-93-ER25164-A000. The government has certain rights to this invention.

FIELD OF THE INVENTION

The present invention pertains to a method for controlling dynamic physical systems and devices and, more particularly, to a method of improving the stability of engineering, chemical, electronic, avionic and mechanical systems and devices.

BACKGROUND OF THE INVENTION

This invention applies to dynamical systems. The invention is a method of controlling systems and devices that have the capacity to change in time, so that their evolution is (approximately) described by deterministic laws. Examples of such systems and devices include mechanical devices, electrical circuits, chemical reactors, etc. An equilibrium of a dynamical system or device is a state of the system or device that does not change in time. Such a system or device is asymptotically stable, if perturbations of the equilibrium state are such that the system or device will eventually return to the equilibrium state of its own accord. A pendulum capable of swinging in a full circle is a simple mechanical device illustrating these concepts; it has two equilibrium positions: motionless, and either hanging down or balanced upright.

Designing systems that have a stable equilibrium at a desired state and then modifying those systems so that an unstable equilibrium becomes stable is a common engineering goal. Feedback control is the standard approach to the second phase. Measurements of the state of the dynamical system are fed to a device that affects the system's motion. In linear feedback control, the amplitude of the control force is set to be a linear function of the displacement of the system from its equilibrium. The feedback law is often computed with a microprocessor.

Again, an example of a pendulum is often used as an illustration. The fulcrum of the pendulum is placed on a cart that can be horizontally accelerated. With the proper feedback law, the pendulum can be kept vertically upright. This example may seem like a "toy", but the principles apply to general systems. For example, process control for the chemical industry often entails the application of feedback control to chemical manufacturing processes. The aforementioned pendulum example can also be regarded as a model for keeping a rocket from falling over by employing horizontal thrust at its base.

The theory of linear feedback control applies to nonlinear systems, but there are limits to its effectiveness. The domain of stability of a feedback controller consists of those states of the system which will be drawn to the equilibrium by the controller. Having a small domain of stability is undesirable, since fluctuations or disturbances may knock the system out of this domain. The results can be catastrophic: a power outage of an electrical power system or an airplane crash; the upright pendulum falls over.

This invention is a feedback control strategy that augments linear feedback control, enlarging the domain in which a system is stabilized. The strategy employs a "hybrid" or "switching" technique to guide a system into the domain of stability of a linear controller from a larger region. The general concept that this might be possible may have been proposed earlier, but the method of this invention is new.

Specifically, the invention features a hybrid strategy that can be implemented in terms of the same data computed at an equilibrium used by a linear controller. From this data, "switching surfaces" in the phase space are determined. When the system encounters one of these switching surfaces, the controller is set to a fixed value, which is maintained until the next time that the system hits one of the switching surfaces or enters the domain of stability of a linear controller. For systems with two unstable degrees of freedom, the method of the invention provides specific choices of switching surfaces, as well as set values for the controller. These lead the system to a stable oscillation that is close to the equilibrium point. When switching surfaces are chosen closer together, the size of this oscillation diminishes, so that the system will enter the region where a linear feedback control can be employed.

SUMMARY OF THE INVENTION

In accordance with the present invention, there is provided a control method for stabilizing systems or devices outside the control domain of a linear controller. When applied to nonlinear systems, the effectiveness of this method depends upon the size of the domain of stability that is produced for the stabilized equilibrium. If this domain is small compared to the accuracy of measurements or the size of disturbances within the system, then the linear controller is likely to fail within a short period. Failure of the system or device can be catastrophic; the system or device can wander far from the desired equilibrium. The method of the invention presents a general procedure to recapture the stability of a linear controller, when the trajectory of a system or device leaves its region of stability. By using a hybrid strategy based upon discrete switching events within the state space of the system or device, the system or device will return from a much larger domain to the region of stability utilized by the linear controller. The control procedure is robust and remains effective under large classes of perturbations of a given underlying system or device.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the stabilization of unstable equilibria is a fundamental problem in the control of engineering systems. A sufficient condition for the stability of an equilibrium point of a smooth dynamical system is that the eigenvalues of its linearization lie in the left-half plane. This is easily proved by several means, e.g., by defining a quadratic Lyapunov function in a neighborhood of the equilibrium. Control theory addresses the questions of when stabilization is possible with the modifications (controller) that can be built into the underlying system. Over the past fifty years, an extensive theory of "linear control" has developed comprehensive procedures for determining when a stabilization problem is solvable, and for designing controllers that implement stabilization. This theory has been widely employed in engineering the design of controllers in communication systems, chemical process control systems, avionic systems, etc. However, linear control is not a panacea for all control problems, even for ones of stabilizing equilibria.

One difficulty that is encountered in some applications is that the domain of attraction of a controlled equilibrium may be small. This leads to unacceptable constraints on system performance. Small, random disturbances in the environment or the inability of an actual physical system to implement its model idealization lead to failures of the controller. The results of the failure can be disastrous in terms of the design objectives. For example, in the double-pendulum example described hereinafter, the failure of a linear controller leads to large motions of the pendulum. In the presence of damping, the pendulum eventually falls to rest at its naturally stable, hanging position.

One of the objectives of the inventive method is to provide a simple, effective means of recovery from the failure of a linear controller. The method of the invention provides a safety net around the (small) domain of attraction of a linear controller, so that, if a disturbance moves a system outside this domain of attraction, it will be guided back into the domain by the application of a different control strategy. The strategy described hereinafter is very general. It can be applied to any system that meets mild "transversality" conditions of having distinct eigenvalues and a control that moves the equilibrium point of the system along a curve that is not tangent to the eigendirections. Moreover, the computations that are required for the design of a controller are based on the linearization of the system at its equilibrium (as with linear controllers).

Figure 1:
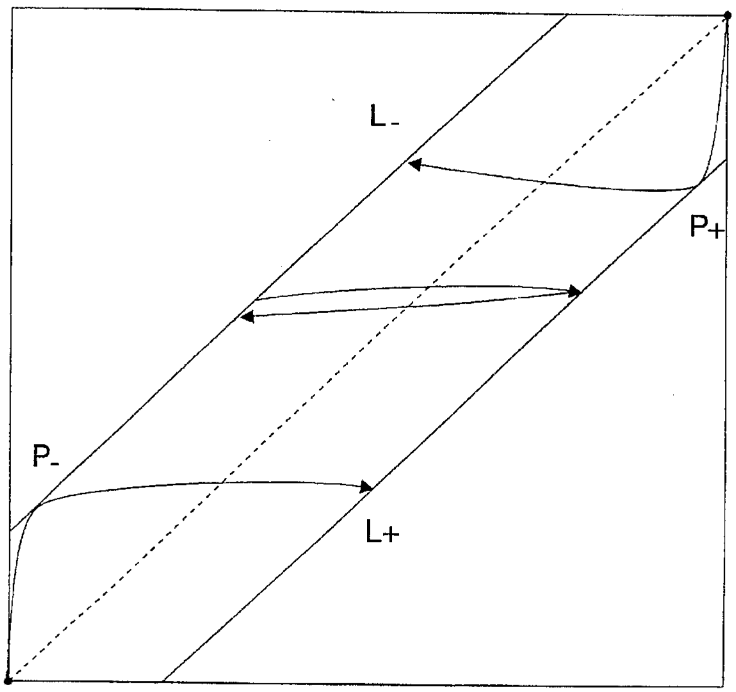
FIG. 1 illustrates a diagram of a trajectory in a bounded region in accordance with the method of the invention.
Figure 1A:
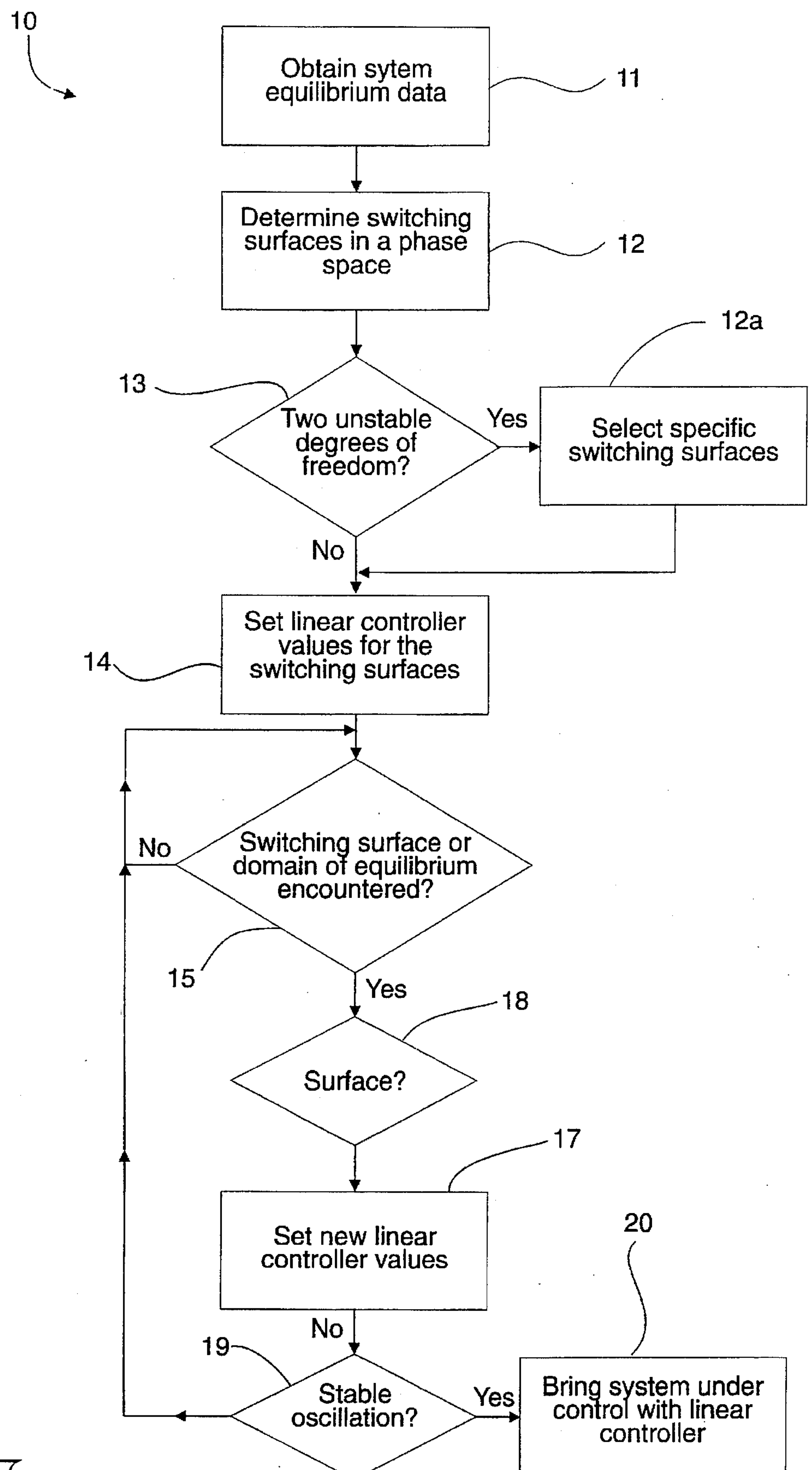
FIG. 1*a* shows a block diagram of the method of this invention.

Referring to FIG. 1*a*, a block diagram 10 of the method of this invention is illustrated. The method of this invention comprises a feedback-control strategy that augments linear-feedback control of a dynamic system by its linear-feedback controller, thus effectively enlarging its domain of stability. The dynamic system, having a trajectory that leaves its region of stability, is brought back thereinto by the inventive method 10.

This method is particularly useful for dynamic systems that are non-linear. The method of stabilization comprises a first step 11 of obtaining data used by a linear controller of the dynamic system in question, at an equilibrium of the system. From this data, switching surfaces in a phase space (a larger domain outside of the region of stability) are determined, step 12. If the systems have two unstable degrees of freedom, step 13, specific choices of switching surfaces are required, step 12*a*. If two unstable degrees of freedom do not exist, step 13, then values for the linear controller are set, step 14.

When the dynamic system has one unstable degree of freedom and encounters switching surface, step 15, the linear controller is set to a fixed value for the specific switching surface encountered, step 17, until such time that the dynamic system encounters one of the other switching surfaces, step 15, or, in the alternative, enters a domain of stability of the linear controller. If the system encounters another switching surface, step 18, the linear controller is set to another fixed value, step 17.

The above procedure eventually leads to obtaining a stable oscillation that is close to the equilibrium point of the system, step 19. If, after encountering one or more switching surfaces, the system enters a domain of stability, the linear controller can then be utilized to bring the system under control, step 20. When switching surfaces are chosen, step 12*a*, they are selected close together, so that the oscillation will be diminished, and a region is eventually entered where the linear-feedback controller can be used, step 20.

The framework in which the control strategy is implemented has precursors in the literature. The terms "switching system", "variable structure system" and "hybrid system" have all been used to describe piecewise smooth vector fields in the context of control. These terms shall be used herein interchangeably. One of the essential aspects of the invention is the presence of "hysteresis" in a piecewise smooth system: there is a discrete component of the state of the system used by the controller, in addition to its location in the underlying state space of the physical system.

The problem domain has the form:

$$V = \bigcup_{\alpha \in I} V_\alpha,$$

where I is a finite index set and $V_\alpha$ is an open, connected subset of $R^n$. Each element in this union is a chart. Each chart has associated with it a (possibly time-dependent) vector field, $f_\alpha$: $V_{60} \times R \rightarrow R^n$. For each $\alpha \in I$, the chart $V_\alpha$ encloses a patch, an open subset $U_\alpha$ satisfying $\overline{U}_\alpha \subset V_\alpha$. The boundary of $U_\alpha$ is assumed piecewise smooth and is referred to as the patch boundary. Together, the collection of charts and patches is called an atlas. The elements of the index set are called modes. For each mode $\alpha \in I$, the patch boundaries are defined by a finite set $J_\alpha^{bf}$ of boundary functions, $h_{\alpha,i}$:$V_\alpha \rightarrow R$, and real numbers are called target values, $C_{\alpha,i}$, for $i \in J_\alpha^{bf}$ that satisfy the condition: for $x \in V_\alpha$, $x \in U_\alpha$ iff $h_{\alpha,i}(x) - C_{\alpha,i} > 0$ for all $i \in J_\alpha^{bf}$, where $\alpha \in I$. The boundary of a patch is assumed to lie within the set:

$$\bigcup_{i \in J_\alpha^{bf}} h_{\alpha,i}^{-1}(\{C_{\alpha,i}\}) \qquad \text{for } \alpha \in I.$$

The evolution of the system is implemented as a sequence of trajectory segments where the endpoint of one segment is connected to the initial point of the next by a transformation, called a transition function. Thus, time is divided into contiguous periods, called epochs, separated by instances where transition functions are applied at times referred to as events. The transition functions are maps defined by subsets $S_\alpha$ of the patch boundaries, called transition sets and transformations $T_\alpha$:$S_\alpha \rightarrow V \times I$, satisfying $\pi_1(T_\alpha(x)) \in \overline{U}_{\pi 2(t\alpha(x))}$, where $\pi_i$ is the natural projection of $V \times I$ onto its $i^{th}$ factor. Thus $\pi_1(T_\alpha)$ is the "continuous" part, and $\pi_2(T_\alpha)$ is the "discrete" part of a transition function. A mode change at an event is called a switch. It is further required that there is a finite partition $\cup W_{\alpha,j}$ of $S_\alpha$ with the properties:

$\pi_2 \circ T_\alpha$ is constant on each $W_{\alpha,j}$ $\phi_{\alpha,j} = \pi_1 \circ T_\alpha|_{W_{\alpha,j}}$ is a smooth mapping defined in a neighborhood of $\overline{W}_{\alpha,j}$.

Structural stability is a useful concept for dynamical systems, wherein perturbations of a system remain equivalent to the reference system by continuous changes of coordinates. In implementing hybrid control for stabilizing equilibria, the inventive method seeks to maintain this type of robustness. Nothing in the controller should be subject to the choice of exact values of any parameters. In particular, the method avoids the use of sliding modes or switches that must be exactly implemented in order to be effective. To a large extent, "robust" control of this sort is antithetical to "optimal" control, which is likely to push one to select parameter values in a system that are borderline for a property. If the property is one that involves the stability of the system, then small perturbations cannot be relied upon to maintain the efficacy of the controller. Here the emphasis is squarely upon robustness.

The invention provides a strategy for maintaining the motion of a trajectory in a bounded region of an unstable equilibrium point with a piecewise constant control. Consider the following linear system as a model example:

$$\dot{\chi}_1=\lambda_1(\chi_1-c)$$

$$\dot{\chi}_2=\lambda_2(\chi_2-c)$$

In Equation 1, c represents a "control" that moves the equilibrium point of the systems along a line. While a particular form is chosen for this system, most planar vector fields with real eigenvalues can be transformed to this representation by a linear change of coordinates. Such a transformation exists if the eigenvalues are distinct, and if the control moves the equilibrium along a line that is not an eigendirection. Assume that $\lambda_1>\lambda_2>0$, so that the equilibrium point is a source.

The goal is to define a feedback control c(x) so that the motion of the system remains within a moderately-sized, bounded neighborhood of the origin. Define a hybrid system with two patches that are half-planes $H_+$ and $H\_$, defined by $y>x-ey<x+e$, respectively. The boundaries of $H_+$ and $H\_$ are the lines $L_\pm$ defined by $y=x\pm e$. These lines are parallel to the control line. In each of the two patches, the control c(x) takes a constant value $c_\pm$. The values of c are chosen with the object of making trajectories in the overlap strip $H_+\cap H\_$ stay in a bounded region of the origin. This defines a hybrid system with parameters $c_\pm$ and e. The goal is now clear: to choose values of these parameters to create a trapping region surrounding the origin.

It can be readily computed that the trajectories of the system 1 are defined by $$\chi_1(t)=c+exp(t\lambda_1)(\chi_1(0)-c)$$

$$\chi_2(t)=c+exp(t\lambda_2)(\chi_2(0)-c)$$

Given e, it is desired to find $c_\pm$ that creates a trapping region around the origin in the strip $-e<x_2-x_1<e$. Along a segment of the right boundary $L_+$ of the strip, it is desirable to have the vector field associated with $H_+$ to point to the left, towards the interior of the strip. Similarly, it is desired that the vector field associated with $H\_$ to point to the right on a segment of the left boundary $L\_$ of $H\_$. These segments are to be chosen so that the flow carries one into the other (see FIG. 1). To choose $c_\pm$ with the desired properties, it is argued as follows. For simplicity, assume that $c_+=-c\_$ so that the system has a symmetry. The symmetry streamlines the analysis, but is not essential to the argument.

Regard the value of c as fixed for the moment. Determine the conditions that are desired to satisfy. Along $L_+$, define the point $p_+$ to be the point where the vector field has slope 1. The point $p_+$ is obtained by solving the equations $$x_2=x_1-e$$

$$\lambda_1(x_1-c)=\lambda_2(x_2-c)$$

the solution of which is $$(x_1,x_2)=\left(c-\frac{\lambda_2}{\lambda_1-\lambda_2}e,\ c-\frac{\lambda_1}{\lambda_1-\lambda_2}e\right)$$

Above $p_+$ on $L_+$, the vector field points to the right of $L_+$. Below $p_+$ on $L_+$, the vector field points to the left of $L_+$. The trajectory starting at $p_+$ should lie above the trapping region in the strip. For example, it might be desirable to have the intersection of the $x_2$ axis with the strip to lie in the trapping region. For this to occur, it suffices that the trajectory with initial condition $p_+$ intersect the strip at a point with a non-negative value of $x_1$. A lower bound for $c_+$ satisfying this criterion is given by the value of c for which the trajectory with initial condition $p_+$ passes through the point (0,e). This yields an implicit equation for c/e in terms of the ratio $\lambda=\lambda_1/\lambda_2$:

$$\frac{\left(\frac{c}{e}\right)^{\lambda_1}}{\left(\frac{c-e}{e}\right)^{\lambda_2}}=\frac{(\lambda_1-\lambda_2)^{(\lambda_1-\lambda_2)}(\lambda_2)^{\lambda_2}}{(\lambda_1)^{\lambda_1}}$$

Representative values of the solution of this equation are given in Table 1 (illustrated below) to three-digit accuracy.

TABLE 1

| λ | c/e |
|---|---|
| 1.5 | 9.444 |
| 2.0 | 5.828 |
| 2.5 | 4.614 |
| 3.0 | 4.0 |
| 3.5 | 3.629 |
| 5.0 | 3.063 |
| 10 | 2.518 |
| 100 | 2.065 |

This discussion leads to the following theorem: Theorem 2.1. Let $c_+/e$ be larger than the solution of the equation $$\frac{\left(\frac{c}{e}\right)^{\lambda_1}}{\left(\frac{c-e}{e}\right)^{\lambda_2}}=\frac{(\lambda_1-\lambda_2)^{(\lambda_1-\lambda_2)}(\lambda_2)^{\lambda_2}}{(\lambda_1)^{\lambda_1}}$$

and set $c\_+-c_+$. Denote by $W_\pm$ the trajectories of the vector fields $X_\pm$ defined by $$\dot{\chi}_1\lambda_1(\chi_1-c_\pm)$$

$$\dot{\chi}_2\lambda_2(\chi_2-c_\pm)$$

passing through the points $(0,\pm e)$. Assume $\lambda_2<\lambda_1$. On the lines $\mathbf{1}_\pm$ defined by $x_2=x_1\mp e$, consider the segments $s_\pm$ with endpoints at $(0,\mp e)$ and the intersections of $W_\pm$ with $\mathbf{1}_\pm$. Then trajectories of $X_+$ with initial conditions on $\mathbf{1}_+$ intersect $\mathbf{1}\_$ and trajectories of $X\_$ with initial conditions on $\mathbf{1}\_$ intersect $\mathbf{1}_+$.

To prove this theorem, it is required to verify that the trajectory of $X\_$ with initial condition at (0,e) intersects the segments $s_+$. From $X_-$, the equation is obtained:

$$\frac{dx_2}{dx_1}=\frac{\lambda_2(x_2+c)}{\lambda_1(x_1+c)}$$

Equation 2 gives the trajectory of $X_-$ with initial condition (0,e) in a form parameterized by $x_1$:

$$\left(x_1,-c+(c+e)\left(1+\frac{x_1}{c}\right)^{\lambda}\right)$$

with $\lambda=\lambda_2/\lambda_1$. Similarly, the trajectory of $X_+$ with initial condition (0,e) is given by $$\left(x_1,c+(c-e)\left(1-\frac{x_1}{c}\right)^{\lambda}\right)$$

These two trajectories intersect at one point in the right half-plane if the trajectory of $X_-$ passes below the point (c,c). Setting $u=x_1/c$ and b=c/e, it is desired to determine when $$-1+(1+b)(1+u)^{\lambda}=1-(1-b)(1-u)\lambda$$

This equation is readily solved for b in terms of u:

$$b=\frac{2-(1-u)^{\lambda}-(1+u)^{\lambda}}{(1+u)^{\lambda}-(1-u)^{\lambda}}$$

At the solution of this equation, it is desired to have $-1+(1+b)(1+u)^{\lambda}-u+b>0$, so that the intersection point of the two trajectories lies above the line $1_+$. This yields the requirement that $$b>\frac{(1+u)-(1+u)^{\lambda}}{(1+u)-(1+u)^{\lambda}}$$

Substituting the value for b at the intersection point into this inequality, and simplifying leads to the requirement that $$2-u(1+u)^{\lambda}+u(1-u)^{\lambda}-2(1-u^2)^{\lambda}>0$$

This inequality holds throughout the unit square in the (u,1) plane, which is the domain of interest. It is concluded that the intersection of the trajectories of $X_+$ and $X_-$ with common initial point (0,e) lies above the line $1_+$, since it was assumed $\lambda<1$.

Recall that the hybrid system X applies a mode switch from $X_-$ to $X_+$ when a trajectory hits $1_+$ from the left, and, similarly, a mode switch from $X_+$ to $X_-$ when a trajectory hits $1_-$ from the right. The theorem implies the following corollary.

Corollary 2.1 With the notations introduced above, define R to be the region bounded by $W_\pm$, the trajectories of $X_\pm$ with initial conditions at $(0,\mp e)$ and $s_\pm$. Then trajectories with initial conditions in R remain in R for all forward time.

Less formally, it is said that R is a trapping region for the hybrid system X. More still can be said about the dynamics of X in R. There are passage maps $\theta_\pm$ that map trajectories with initial conditions on $s_\pm$ to their intersections with $s_\mp$. The maps $\theta_\pm$ are monotone, so the composition $\theta_-$ o $\theta_+$ is a monotone map of the interval $s_+$ into itself. It follows that this return map has a stable fixed point, representing a stable periodic orbit for the hybrid system. Additional computations lead to the conclusion that the return map is a contraction and has only a single fixed point. To carry forward these computations, use the coordinates which scale c to 1, writing $u=x_1/c$ and b=e/c as in the proof of the theorem. The trajectory starting on the line $1_-$ with initial value $u=u_0$ is given by $$\left(u_0,-1+(1+b+u_0)\left(\frac{1+u)}{1+u_0}\right)^{\lambda}\right).$$

The intersection of the trajectory occurs at a value of $u=u_1$ satisfying $$-1+(1+b+u_0)\left(\frac{1+u}{1+u_0}\right)^{\lambda}-u_1+b=0$$

Estimate $du_1/du_0$ from this equation. From the equivalent equation $$\frac{(1+u_0)^{\lambda}}{1+u_0+b}=\frac{(1+u_1)^{\lambda}}{1+u_1-b},$$

deduce that $du_1/du_0<1$. The right-hand side of the last equation defines a function of $u_1$ which intersects the function of $u_0$ on the left-hand side crossing from above to below while decreasing. Therefore, implicitly differentiating the last equation gives $du_1/du_0<1$. From this, conclude that the return map of the hybrid system has a derivative smaller than 1 and is a contraction.

Theorem 2.2. With the same hypotheses of the previous theorem and corollary, there is a stable limit cycle for the hybrid system that is globally attracting for all initial conditions in the trapping region R.

Due to the symmetry of the hybrid system, the stable limit cycle is symmetric with respect to the origin. In systems with equilibria that are saddle points with two-dimensional unstable manifolds, the procedure described above can be applied with switching surfaces that are hyperplanes tangent to the directions spanned by the stable manifold of the equilibrium and the tangent to the control curve.

The previous results can be extended and improved in a number of ways. Two are described below:

The barriers described in the previous discussion can be combined with linear controllers. If one knows a region around the equilibrium that lies in the domain for a linear controller, then one can define a hybrid system with three patches: the system described in the previous section, and a domain cut from these two patches in which the linear controller will be applied. If the stable limit cycle of the switching system intersects the domain in which the linear controller is applied, then the barriers and switching system serve to guide the system to the domain of the linear controller from initial conditions between the two barriers. To prevent the system from exiting the domain of the linear controller, distinct boundaries can be defined to switch the linear controller on and off.

Figure 2:
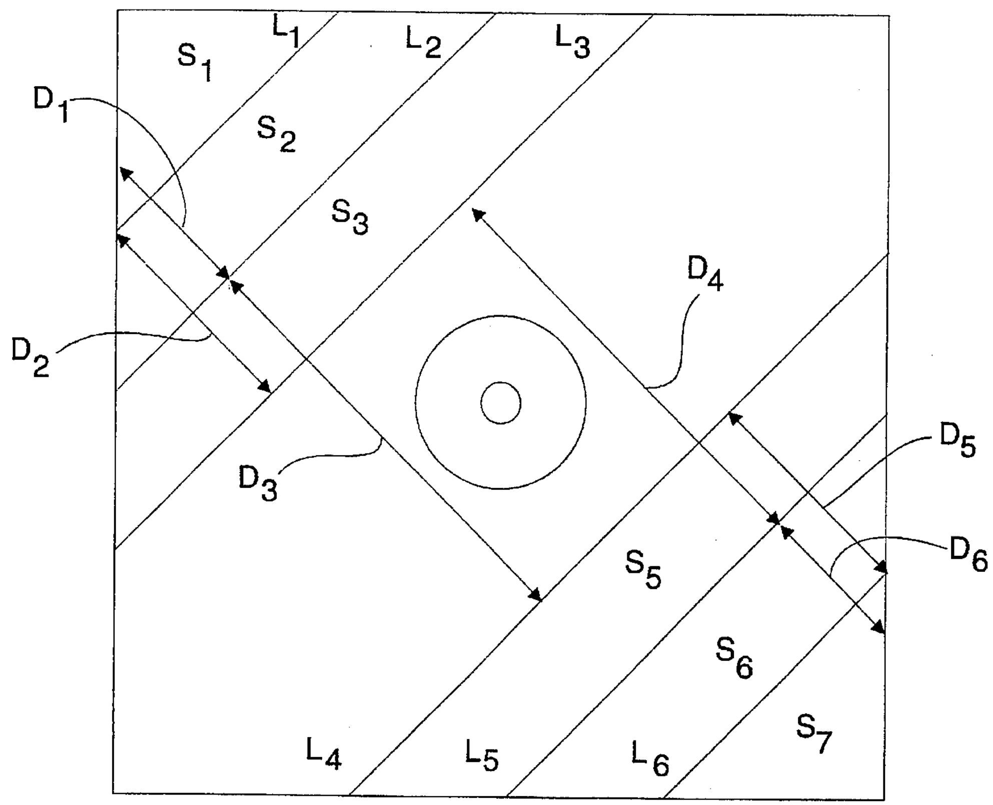
FIG. 2 depicts a diagram illustrating multiple barriers that guide a trajectory back towards a system origin position, in accordance with the method of this invention.

The second extension of the controller described in the previous discussion is to place in the system multiple barriers that are parallel to one another. Consider, for example, a planar system with six barriers that are parallel lines $1_i$, i=1, . . . , 6. The lines $1_i$ divide the plane into seven closed "strips", $S_i$, i=1, . . . ,7. $S_1$ and $S_7$ are half-planes. From the $S_i$, six overlapping patches are formed, $D_i=S_i\cup S_i+1$. In each of these patches, define a constant control that increases in magnitude as one moves away from the control line. The transition conditions are defined so that if one crosses a patch boundary moving away from the control line, then the control setting of larger magnitude is applied. If one crosses a patch boundary moving towards the control line, then the control value changes to one of smaller magnitude. The effect of these barriers is to guide a trajectory back towards the origin from a point farther away from it, while at the same time decreasing the amplitude of the control when feasible. Combining these multiple barriers with a linear controller in a neighborhood of the origin allows one to recover from disturbances of large size that move the system outside the region of stability for the linear controller. See FIG. 2 for an illustration of the patches associated with a system that has three pairs of barriers and a domain where the linear controller will be applied.

Example: Double Pendulum on a Cart

Figure 3:
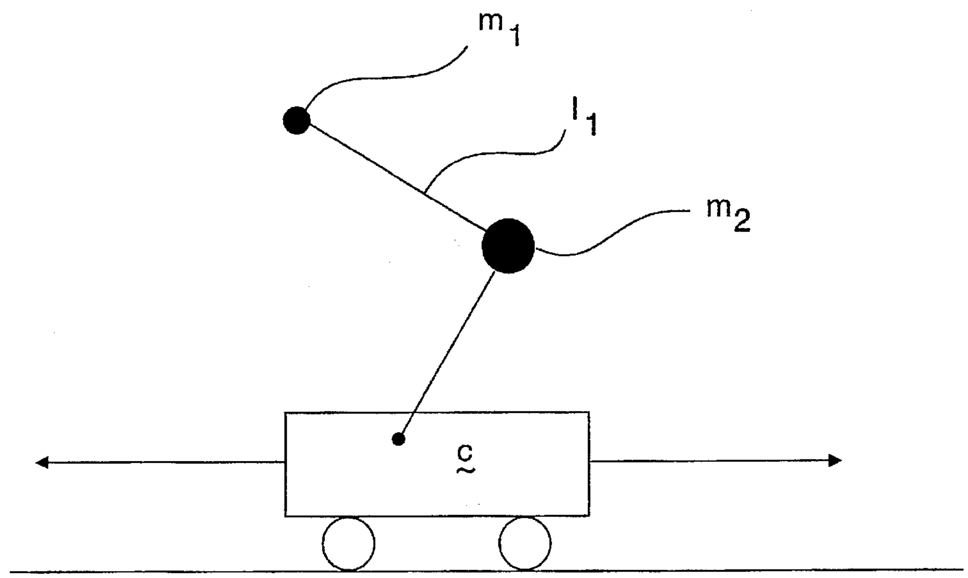
FIG. 3 shows a schematic diagram of a double-pendulum example, that is utilized to illustrate the method of the invention.

An example is described for a frictionless double-pendulum on a zero-mass cart "C", having an acceleration that can be controlled along a track, as illustrated in FIG. 3. The object is to keep the pendulum in a fully upright position. This example provides a good illustration of the effectiveness of the stabilization strategy on a nonlinear system.

The double pendulum consists of two point masses $m_1$ and $m_2$, with body 1 being attached to a fulcrum and to body 2 by massless rigid rods of lengths $1_1$ and $1_2$. Included within the system of equations is the additional effect of applying a horizontal acceleration. (See FIG. 3.) Choose units for which the acceleration of gravity is 1, let the magnitude of the acceleration be $\alpha$ and set $\mu=1+m_1/m_2$. Then the equations of motion are given by the following vector field X:

$$\dot{q}_1 = p_1$$

$$\dot{q}_2 = p_2$$

$$\dot{p}_1 = \frac{\begin{array}{c}\sin(q_2)\cos(q_1-q_2)-\mu\sin(q_1)-\\(l_2p_2^2+l_1p_1^2\cos(q_1-q_2))\sin(q_1-q_2)\end{array}}{l_1(\mu-\cos^2(q_1-q_2))} + \frac{\alpha(-\mu\cos(q_1)+\cos(q_2)\cos(q_1-q_2)}{l_1(\mu-\cos^2(q_1-q_2))}$$

$$\dot{p}_2 = \frac{\begin{array}{c}\mu(\sin(q_1)\cos(q_1-q_2)-\sin(q_2))+\\(\mu l_1p_1^2+l_2p_2^2\cos(q_1-q_2))\sin(q_1-q_2)\end{array}}{l_2(\mu-\cos^2(q_1-q_2))} + \frac{\alpha(-\mu\cos(q_2)+\mu\cos(q_1)\cos(q_1-q_2)}{l_2(\mu-\cos^2(q_1-q_2))}$$

Here $q_1$,$q_2$ are angular coordinates and $p_1$,$p_2$ are the conjugate momenta. The angles $q_1$,$q_2$ are measured with respect to vertical rays pointing down, so that the stable equilibrium with the pendulum hanging down is given by $q_1=q_2=p_1=p_2=0$. The vertically upright position that is desired to be stabilized is given by $q_1=q_2=\pi$ and $p_1=p_2=0$.

The vertically upright position is an equilibrium of the pendulum equations (without horizontal acceleration), having a two-dimensional stable manifold and a two-dimensional unstable manifold. Therefore, the theory described earlier can be applied. To do so, it is necessary to construct a linear controller; a region in which the linear controller will be applied; barriers that are parallel to the hyperplanes spanned by the control line and the stable manifold at the vertical equilibrium; and control values for each of the patches to be used by the controller outside the patch of the linear controller.

The linear controller is defined by making the acceleration of the pendulum fulcrum a linear function of the location of the pendulum in phase space. For convenience, see coordinates $(-\sin(q_1), -\sin(q_2), p_1, p_2)$ near the upright equilibrium. A vector $\gamma=(g_1,g_2,g_3,g_4)$ is sought, so that setting $\alpha=g_1q_1+g_2q_2+g_3p_1+g_4p_2$ makes the upright equilibrium stable. Treating the eigenvalues of the linearization as functions of the control coefficients $g_i$ gives a system of equations that can be solved for the $g_i$. Let $\lambda_i$, i=1 . . . 4 as the desired eigenvalues for the controlled system. Denoting the Jacobian matrix of the vector field by A and by $v=\partial A/\partial\alpha$, vectors $w_i\neq 0$ and $\gamma$ are sought, so that $$(A+\gamma \otimes v)w_i=\lambda_i w_i.$$

If $A+\lambda I$ is invertible, rewrite this equation as $$-\gamma(w_i)(A-\lambda_i I)^{-1}v=w_i.$$

It follows that $w_i$ is a multiple of $(A-\lambda_i I)^{-1}v$ and $$\gamma((A-\lambda_i I)^{-1}V)=-1.$$

As i varies in (1,2,3,4), this yields a system of linear equations for $\gamma$. If the system is non-singular, then it uniquely determines $\gamma$ in terms of the eigenvalues $\lambda_i$.

A numerical example with parameters $l_1=½$, $l_2=¾$, $m_1=2$, $m_1=1$ and $\{\lambda_1,\lambda_2,\lambda_3,\lambda_4\}=\{-0.4,-0.5,-0.6,-0.7\}$ has been investigated. This gives (exactly) $\gamma=(-3.395,2.416,-1.1,1.2595)$. Using these parameter values, a model of the double pendulum with the hybrid, switching control strategy described in the last section is numerically investigated. The only modification of the strategy was to define two neighborhoods of the vertical pendulum on which switches to and from the linear controller were applied. This was done because many of the linearly controlled trajectories do not approach the equilibrium with monotonically decreasing distance.

Figure 4A:
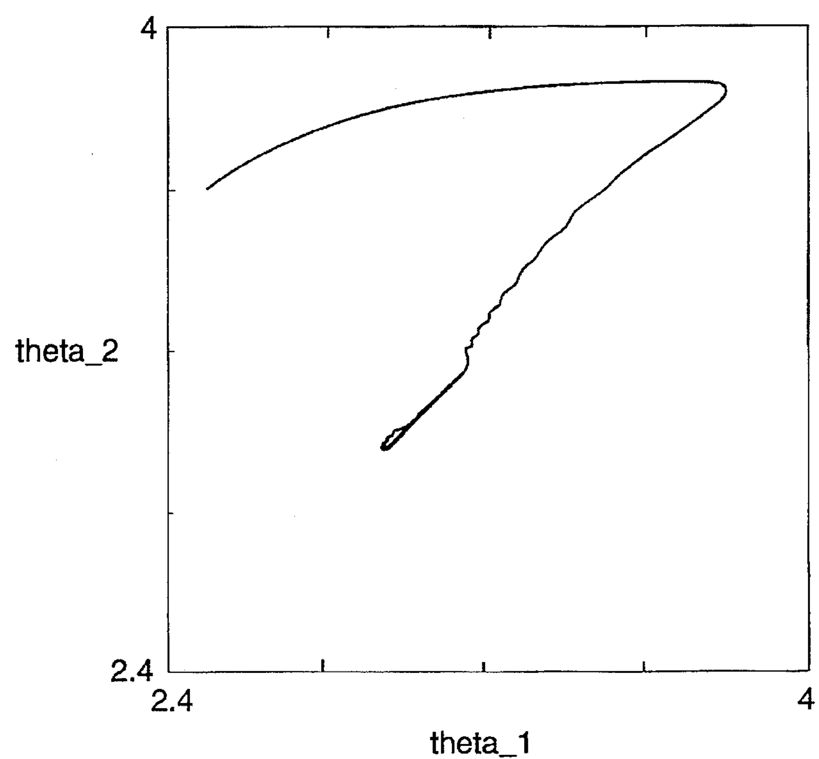
FIGS. 4*a*, 4*b* and 4*c* respectively illustrate graphical data of computed trajectories for the double-pendulum example shown in FIG. 3.
Figure 4B:
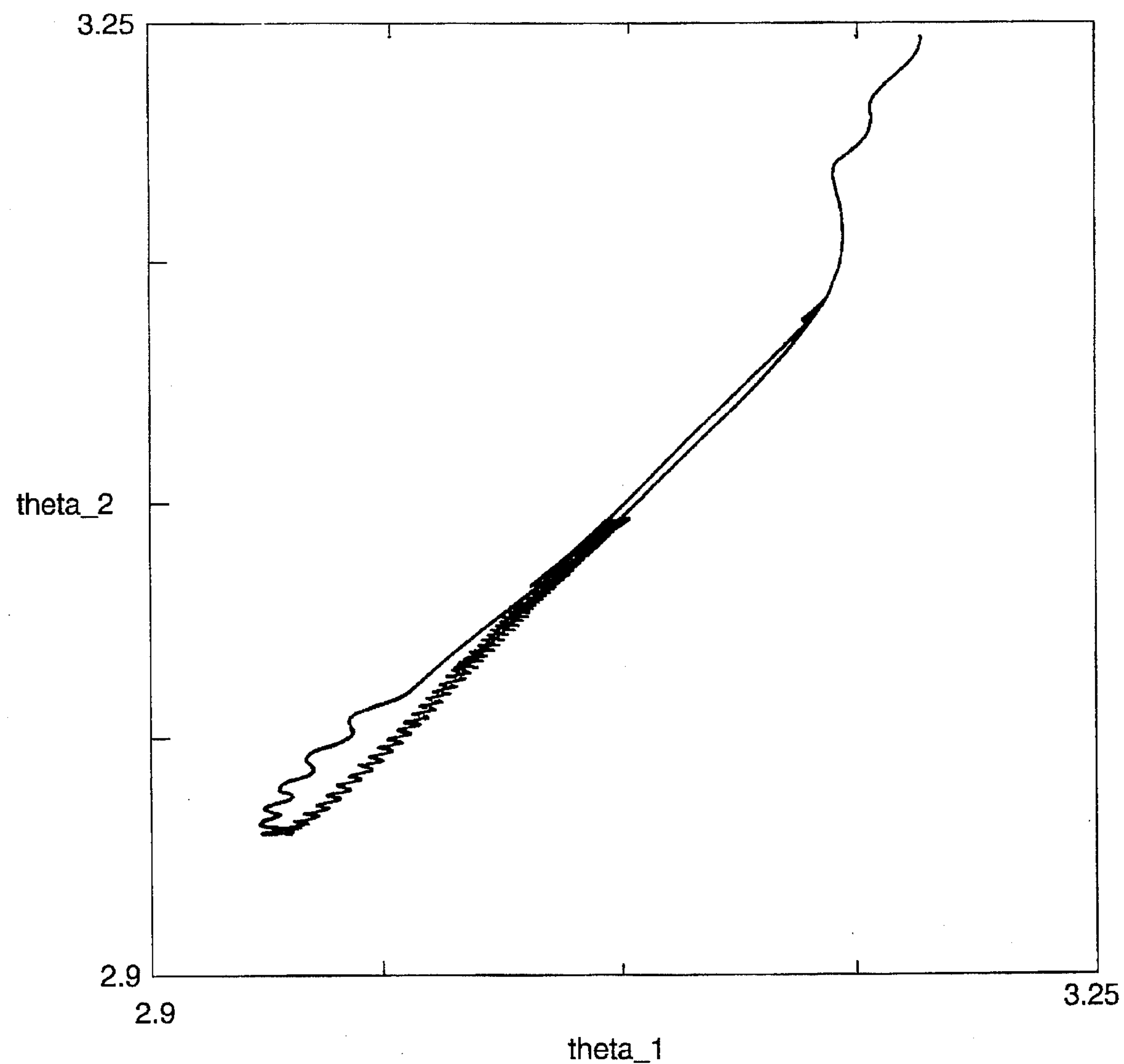
Figure 4C:
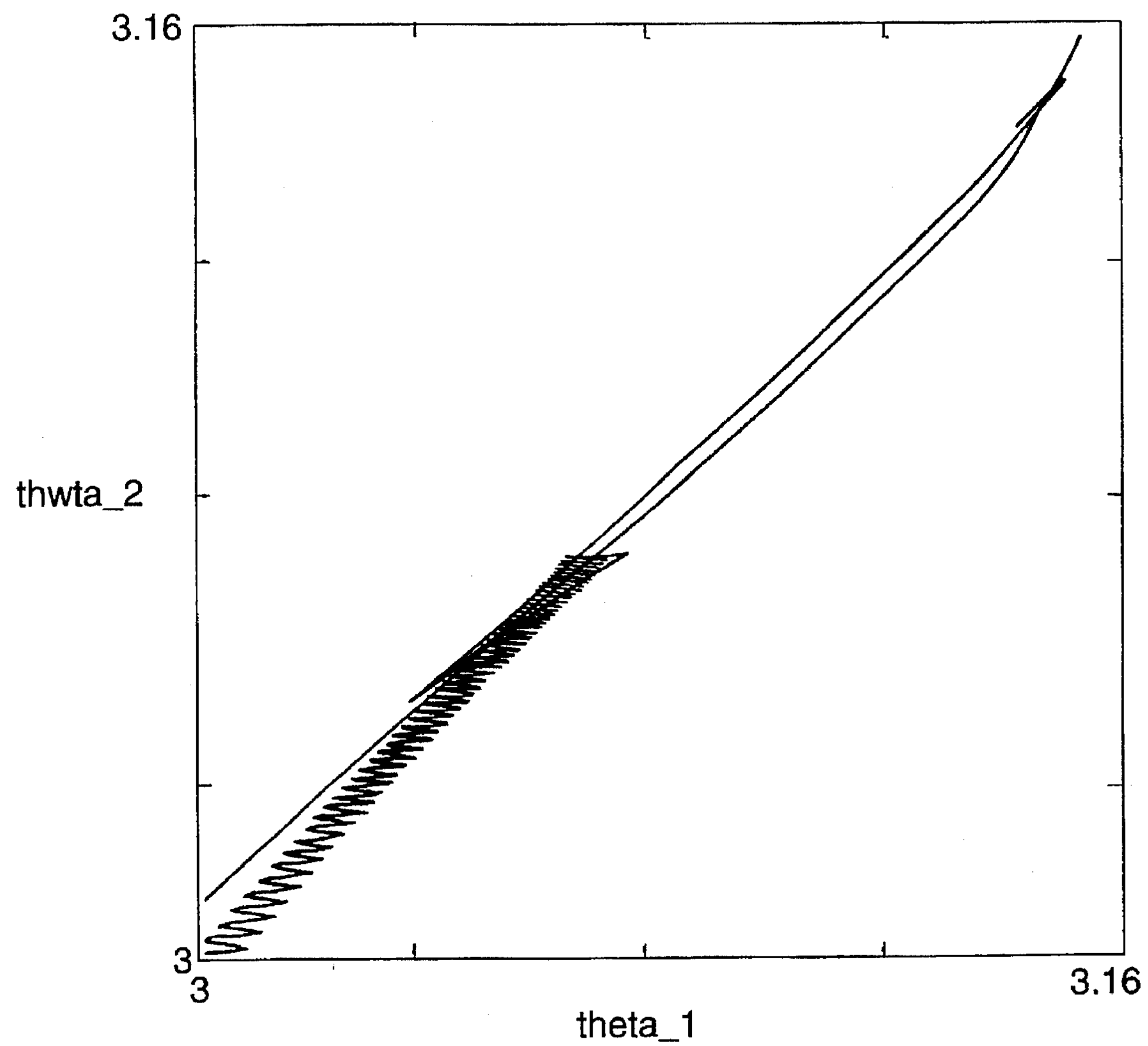

To test the effectiveness of this controller, trajectories were computed on a grid of initial conditions in the plane $p_1=p_2=0$. The domain of stability of the linear controller in this plane contains a small, elongated region around the equilibrium diagonal $q_1=q_2$; the length along the diagonal is approximately 0.5, and the width is approximately 0.07. For the switching system, level sets were used of the function $h=(q_1-\pi)/4-(q_2-\pi)/4+p_1/12-p_2/6$ as the switching surfaces. The function h was computed so that it is parallel to the hyperplane spanned by the control direction (0,0,2,0) and the stable eigenvectors at the fully upright equilibrium. With switching surfaces given by h=-0.5, h=-0.3, h=-0.1, h=0.1, h=0.3 and h=0.5 with corresponding values for $\alpha$ of 5,3,1, -1,3,5, there is a much larger domain of attraction for the upright pendulum. In the plane $p_1=p_2=0$, it appears that the square with vertices at the points $(q_1,q_2)=(2.5,2.5)$ and $(q_1,q_2)=(3.7,3.7)$ is completely contained in the domain of attraction for the upright pendulum. See FIG. 4*a* for a projection of a typical trajectory into the plane $p_1=p_2=0$. FIGS. 4*b* and 4*c* show magnifications of this trajectory close to the upright equilibrium. The width of this square is an order of magnitude larger than the width of the domain of stability for the linear controller in the plane $p_1=p_2=0$. If the linear controller is not used, then the asymptotic state is the limit cycle described earlier. Switching to and from the linear controller when the square of the distance to the upright equilibrium is 0.002 and 0.005, respectively, appears to robustly stabilize the pendulum at the precise upright state. Note that $0.005\approx(0.07)^2$, so that the disk for switching the linear controller off could not be chosen any smaller and still remain in the basin of attraction of the vertical equilibrium for the linear controller. The addition of stochastic perturbations to the vector field do not appear to significantly diminish the size of the domain of attraction for the Upright equilibrium.

As illustrated by this Example, the hybrid or switching strategy that has been presented for the stabilization of equilibria appears to be robust. All aspects of the strategy seem to be "structurally stable" and persistent with respect to very general types of perturbations. It augments linear control for stabilizing equilibria by guiding a trajectory back into the domain of attraction for a linear controller from a much larger region.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of augmenting linear-feedback control of a dynamic system with its linear controller, said dynamic system having a trajectory that has left its region of stability and is thereafter brought back into stability, the method comprising the steps of:

a) obtaining data used by said dynamic system's linear controller at an equilibrium of the dynamic system;

b) determining switching surfaces in a phase space outside of a region of equilibrium or a domain of stability of said dynamic system;

c) encountering one of said switching surfaces determined in step (b);

d) setting said linear controller to a fixed value upon encountering said switching surface of step (c);

e) encountering at least one other switching surface determined in step (b);

f) setting said linear controller to a fixed value for each switching surface encountered in step (e);

g) obtaining a stable oscillation that is close to an equilibrium point of the dynamic system; and h) utilizing said linear controller to bring said dynamic system under control.

2. The method in accordance with claim 1, wherein said dynamic system comprises a non-linear system.

3. The method in accordance with claim 1, wherein said dynamic system comprises at least two unstable degrees of freedom, said method further comprising the step of:

i) choosing specific ones of said switching surfaces upon which to set a fixed value for said linear controller.

4. The method in accordance with claim 3, wherein said choosing of said switching surfaces in accordance with step (i) comprises the further step of:

j) choosing specific ones of said switching surfaces that are close enough together so that oscillations will be diminished.

5. A method of augmenting control of a dynamic system with its linear controller, said dynamic system having a trajectory that has left its region of stability, and is thereafter brought back into stability, the method comprising the steps of:

a) obtaining data used by said dynamic system's linear controller at an equilibrium of the dynamic system;

b) determining switching surfaces in a phase space outside of a domain of stability or a region of equilibrium of said dynamic system;

c) encountering one of said switching surfaces determined in step (b);

d) setting said linear controller to a fixed value upon encountering said switching surface of step (c);

e) obtaining a stable oscillation that is close to an equilibrium point of the dynamic system; and f) utilizing said linear controller to bring said dynamic system under control.

6. The method in accordance with claim 5, wherein said dynamic system comprises a non-linear system.

7. The method in accordance with claim 5, wherein said dynamic system comprises at least two unstable degrees of freedom, said method further comprising the step of:

g) choosing specific ones of said switching surfaces upon which to set a fixed value for said linear controller.

8. The method in accordance with claim 7, wherein said choosing of said switching surfaces in accordance with step (g) comprises the further step of:

h) choosing specific ones of said switching surfaces that are close enough together so that oscillations will be diminished.

9. A method of augmenting control of a dynamic system with its linear controller, said dynamic system having a trajectory that has left its region of stability, and is thereafter brought back into stability, the method comprising the steps of:

a) obtaining data used by said dynamic system's linear controller at an equilibrium of the dynamic system;

b) determining switching surfaces in a phase space outside of a region of equilibrium or a domain of stability of said dynamic system;

c) encountering one of said switching surfaces determined in step (b);

d) setting said linear controller to a fixed value upon encountering said switching surface of step (c);

e) entering a domain of stability for said linear controller; and f) utilizing said linear controller to bring said dynamic system under control.

10. The method in accordance with claim 9, wherein said dynamic system comprises a non-linear system.

11. The method in accordance with claim 9, wherein said dynamic system comprises at least two unstable degrees of freedom, said method further comprising the step of:

g) choosing specific ones of said switching surfaces upon which to set a fixed value for said linear controller.

12. The method in accordance with claim 11, wherein said choosing of said switching surfaces in accordance with step (g) comprises the further step of:

h) choosing specific ones of said switching surfaces that are close enough together so that oscillations will be diminished.

* * * * *